United States Patent [19]
Saliba et al.

[11] Patent Number: 6,052,710
[45] Date of Patent: *Apr. 18, 2000

[54] SYSTEM AND METHOD FOR MAKING FUNCTION CALLS OVER A DISTRIBUTED NETWORK

[75] Inventors: Bassam A. Saliba, Kirkland; Thomas A. Grate, Redmond, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/670,882

[22] Filed: Jun. 28, 1996

[51] Int. Cl.$^7$ ................................................ G06F 13/00
[52] U.S. Cl. ............................................................ 709/203
[58] Field of Search ........................ 380/23, 49; 395/600, 395/200.9, 614, 800, 200.01; 709/200, 201, 203, 217, 218, 219; 705/26, 27

[56] References Cited

U.S. PATENT DOCUMENTS

| | | | |
|---|---|---|---|
| 5,671,279 | 9/1997 | Elgamal | 380/23 |
| 5,701,451 | 12/1997 | Rogers et al. | 395/600 |
| 5,715,453 | 2/1998 | Stewart . | |
| 5,729,594 | 3/1998 | Klingman | 379/93.12 |
| 5,774,670 | 6/1998 | Montulli . | |
| 5,809,144 | 9/1998 | Sirbu et al. . | |
| 5,815,657 | 9/1998 | Williams et al. . | |
| 5,826,242 | 10/1998 | Montulli . | |

OTHER PUBLICATIONS

Gaines, Porting Interactive Applications to the Web, Internet, pp. 1–18, Dec. 7, 1995.

Trevor, Exorcising Daemons: a modular and lightweight approach to depolying applications, Internet, pp. 1–11, Mar. 8, 1996.

Special Edition Using HTML, Second Edition; Electronic Version, Que Publishers, see H for HTML, May. 21, 1996.

A Dynamic, Schema–Independent Web Interface for a Relational Database, R.W.Lee and S. Petrov, pp. 1–15, Dec. 12, 1995.

*Primary Examiner*—Moustafa M. Meky
*Attorney, Agent, or Firm*—Lee & Hayes, PLLC

[57] ABSTRACT

An extensible, bi-directional function calling protocol tunnels function call requests and responses through the HTTP (HyperText Transport Protocol) message stream of a standard Web browser and a standard Web server. In a preferred embodiment, the protocol is used to exchange information between an electronic commerce client application ("commerce client") which runs on the computer of a World Wide Web user, and an electronic commerce server application ("commerce server") which runs on a Web site. The protocol specifies a format for embedding a generic client-to-server function call within HTML (HyperText Markup Language) content such that a user can initiate the function call while viewing an HTML document via the standard Web browser. Specialized functions such as "get price," "get inventory," and "calculate tax" can thereby be placed within standard Web documents, such as electronic catalog documents used by online merchants to sell products. Client-to-server function calls are passed as HTTP POST messages from the Web browser to the Web server; server-to-client function calls are passed as MIME messages returned to the Web browser. Because all information is passed using standard HTTP messages, end users can access the electronic commerce system from behind Internet firewalls that permit the passage of HTTP traffic.

33 Claims, 10 Drawing Sheets

```
<HTML>

<!---WFCP FORMATTED CALL--->

<FORM ACTION=HTTP://WWW.MERCHANT.COM/MIG.DLL
     METHOD="POST"
     ENCTYPE="APPLICATION/X-WWW-FORM-URLENCODED">

<INPUT TYPE=HIDDEN NAME=OBJECT VALUE=MSTAXENGINE.1>
     <INPUT TYPE=HIDDEN NAME=INTERFACE VALUE=ITAXCALCULATION>
     <INPUT TYPE=HIDDEN NAME=METHOD VALUE=CALCULATETAXDUE>
     <INPUT TYPE=HIDDEN NAME=ARGS VALUE=ARGLIST>

<INPUT TYPE=SUBMIT VALUE="CALCULATE SALES TAX">

</FORM>

</HTML>
```

FIG. 4

```
<HTML>

<!---LOCAL WFCP FOMATTED CALL--->

<FORM ACTION=HTTP://127.0.0.1:100
    METHOD="POST"
    ENCTYPE="APPLICATION/X-WWW-FORM-URLENCODED">

<INPUT TYPE=HIDDEN NAME=OBJECT VALUE=WALLETOCX.1>
    <INPUT TYPE=HIDDEN NAME=INTERFACE VALUE=IWALLET>
    <INPUT TYPE=HIDDEN NAME=METHOD VALUE=SHOWWALLET>
    <INPUT TYPE=HIDDEN NAME=ARGS VALUE=ARGLIST>

<INPUT TYPE=SUBMIT VALUE="SHOW WALLET">

</FORM>

</HTML>
```

FIG. 6

EVENT

A. USER VIEWS HTML DOC WITH EMBEDDED LOCAL FN-CALLING INFO.

B. HTTP POST WITH FN-CALLING INFO. PASSED TO TCP/IP STACK

C. HTTP POST ROUTED TO PORT LISTENER

D. PORT LISTENER PASSES FN-CALLING INFO. TO FN-CALLING CODE

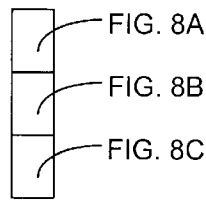

```
<HTML>

<HEAD>
<TITLE>MICROSOFT SHOPPING BASKET</TITLE>
</HEAD>

<BODY BGCOLOR="#FFFFFF" TEXT="#000000" LINK="#000066"
VLINK="#808080" ALINK="#FF0000" TOPMARGIN=0 BACKGROUND="BG.GIF">
<NOBR>

<!--------------MICROSOFT® LOGO--------------->
<A HREF = "HTTP://WWW.MICROSOFT.COM"><IMG SRC="MSHPLOGO.GIF" BORDER=0
ALT="WHERE DO YOU WANT TO GO TODAY?"></A>

<!-----------------TOOLBAR------------------->
<A HREF="FILE:BASE.HTM"><IMG SRC="BASKET.GIF" BORDER=0 ALT="HELP"
HSPACE=0></A>
<A HREF="FILE:HISTORY.HTM"><IMG SRC="ORDER.GIF" BORDER=0 ALT="FEEDBACK"
HSPACE=0></A>
<A HREF="FILE:WALLET.MSTP"><IMG SRC="WALLET.GIF" BORDER=0 ALT="HELP"
HSPACE=0></A>
<A HREF="HTTP://WWW.MICROSOFT.COM"><IMG SRC="HELP.GIF" BORDER=0
ALT="HELP" HSPACE=0></A>
</NOBR>

<!----------MERCHANT SECTION--------------->
<HR>
<TABLE BGCOLOR=#FFFFDD BORDER=2>
<TH VALIGN=TOP WIDTH=100>

<A HREF="HTTP://WWW.WAL-MART.COM"><IMG SRC="WM-HELF.GIF" BORDER=0
ALT=""><BR>ASK RAY IF YOU HAVE ANY QUESTIONS ...</A>

<TD VALIGN=TOP WIDTH=470>

<CENTER>    <IMG SRC="WM-LOGO.GIF"    BORDER=0    ALT="">
</CENTER><BR>WE'RE GLAD YOU ARE SHOPPING WITH US!<BR><FONT SIZE=-2>
<BR>EXPERIENCE THE WAL-MART® DIFFERENCE ON THE WEB - THE PEOPLE, THE
MERCHANDISE, AND MOST OF ALL, THE PRICES.  HERE, YOU'LL FIND A LITTLE BIT OF
EVERYTHING AND MORE.  THANK YOU FOR SHOPPING AT WAL-MART®.</FONT>
</TD>

</TABLE>
```

```
<!-----------------LINE ITEMS----------------->
<TABLE BGCOLOR=#008080 BORDER=3>
<TR>
<TD VALIGN=TOP WIDTH=575>

<TABLE BORDER=2 BGCOLOR=#FFFFDC>

<!-------LINE ITEM-------->
<TH BGCOLOR=#000000 BORDER=1 WIDTH=100>
<FONT FACE="ARIAL" COLOR=#FFFFFF SIZE=+1>
<B>
MS OFFICE 95
</B>
</FONT>
<A HREF=
>
<BR><HR>
<IMG SRC=M<IMG SCR=OFFICE.GIF
WIDTH=130 HEIGHT=130 BORDER=0 ALT="">
</A>
<FONT FACE="ARIAL" COLOR=#FFFFFF SIZE=-3>
<BR>
<NOBR>
<INPUT TYPE="CHECKBOX" NAME="LI1" BUY CHECKED>
<NOBR> $199.99 <NOBR>
QUANTITY: <NOBR>
2
</FONT>
</TH>
<!-----END OF LINE ITEM----->

</TABLE>
<!-----END TABLE CONTAINING LINES----->

<!---TABLE CONTAINING TOTALS---------->
<TABLE BORDER=2 BGCOLOR=#FEFEDC>

<!----CALCULATE TAX FORM--------------->
<!----WFCP FOMATTED CALL-------------->

<TH NOWRAP BGCOLOR=#000000 WIDTH=250>
<FONT FACE="ARIAL" COLOR=FFFFFF SIZE=+1>
<B>GRAND TOTAL: $ 399.98</B>
</TH>
```

<FORM ACTION=HTTP://WWW.WALMART.COM/VIPISAPI.DLL
  METHOD="POST"
  ENCTYPE="APPLICATION/X-WWW-FORM-URLENCODED">

<INPUT TYPE=HIDDEN NAME=OBJECT VALUE=MSTAXENGINE.1>
<INPUT TYPE=HIDDEN NAME=METHOD VALUE=CALCTAX>
<INPUT TYPE=HIDDEN NAME=ARGS VALUE="PRODUCTID'S AND PRICES">

<TH NOWRAP BGCOLOR=#000000 WIDTH=420><FONT FACE="ARIAL"
COLOR=#FFFFFF SIZE=+1>
SHIP TO <SELECT NAME="SHIPPINGTO">

<OPTION VALUE="GEOCODE1">MY HOME ADDRESS
<OPTION VALUE="GEOCODE2">MY WORK ADDRESS

</FONT>
</SELECT>
</TD>

<TD>
<INPUT TYPE=IMAGE SRC="UPDATE.GIF">

</FORM>

<!-------PAYNOW FORM--------------->
<!-------LOCAL WFCP CALL---------->

<FORM ACTION=HTTP://127.0.0.1:100
  METHOD="POST"
  ENCTYPE="APPLICATION/X-WWW-FORM-URLENCODED">

<INPUT TYPE=HIDDEN NAME=OBJECT VALUE=MSBASKET.1>
<INPUT TYPE=HIDDEN NAME=METHOD VALUE=PAYNOW>
<INPUT TYPE=HIDDEN NAME=ARGS VALUE="MERCHANTID">

<INPUT TYPE=IMAGE SRC="PAY.GIF">

</TABLE>

</TABLE>
```

FIG. 8C

SYSTEM AND METHOD FOR MAKING FUNCTION CALLS OVER A DISTRIBUTED NETWORK

FIELD OF THE INVENTION

This invention relates to client-server communications over distributed public networks such as the Internet, including the ability to make function calls through network firewalls. Additionally, this invention relates to the use of existing World Wide Web components and protocols to efficiently and flexibly conduct electronic commerce over the Internet.

BACKGROUND OF THE INVENTION

The present invention addresses a variety of problems that are encountered in the context of allowing merchants and consumers to efficiently and reliability engage in electronic commerce over the Internet.

Various approaches exist for allowing merchants and consumers to exchange and process information, via the Internet, for the purpose of buying and selling goods. One common approach involves the use of the World Wide Web's Hypertext Transfer Protocol ("HTTP"), which is a standard client-server protocol for the transfer of hypertext documents (i.e., documents which include textual links to other documents) over the Internet. With this approach, the consumer uses a Web browser to request and download hypertext documents from merchant Web sites. (The client and server software components of the World Wide Web are commonly referred to respectively as the "Web browser," which runs on the user's computer, and the "Web server," which runs on a Web site.) These hypertext documents, which are created using HTML (the Hypertext Markup Language), contain the various product offerings and other purchase-related information of the respective merchants, and typically include forms for allowing consumers to return payment and address information to the merchants. One significant problem with this approach is that the existing World Wide Web components (e.g., HTTP, HTML, and existing standard Web browsers) are not well suited for performing general purpose client-server transactions over the Internet, making it difficult to migrate commerce-related functionality to the client (consumer) side.

Another approach to the problem of performing commerce-related transactions over the Internet involves the use of specialized client and server software components which communicate with one-another using some transport protocol other than HTTP. This approach, which is used by the version 1.0 electronic commerce system of eShop Inc., generally requires the use of some dedicated TCP/IP port other than port 80, which is reserved for HTTP. (TCP/IP is a low level Internet communications protocol which uses port definitions to route messages to applications.) Unfortunately, many company networks have Internet firewalls (i.e., systems which restrict traffic into and/or out of the company network to provide network security) which block traffic on TCP/IP ports other than port 80 (and possibly a few other reserved ports), preventing consumers from using such electronic commerce systems from their computers at work. Additionally, systems of this type do not take advantage of the widespread use by potential consumers of the World Wide Web.

What is needed, therefore, is a client-server transport mechanism which allows consumers and merchants to communicate through Internet firewalls, but which provides sufficient flexibility and extensibility to allow complex electronic commerce functionality to be integrated into client and server software components.

SUMMARY OF THE INVENTION

The present invention provides an extensible, bi-directional function calling protocol that tunnels function call requests and responses through the HTTP message stream of a standard Web browser and a standard Web server. In a preferred embodiment, the protocol is used to exchange information between an electronic commerce client application ("commerce client") which runs on the computer of a World Wide Web user, and an electronic commerce server application ("commerce server") which runs on a Web site. In an electronic shopping implementation of the system, the commerce client includes the functionality of a shopping basket, a wallet, and an address book, and the commerce server includes functionality for performing specialized functions such as retrieving price and inventory information, calculating sales tax due, and calculating shipping and handling costs. Because all information is passed between the commerce client and server using standard HTTP messages, end users can advantageously access the online commerce system from behind Internet firewalls that permit the passage of HTTP traffic.

In accordance with one aspect of the invention, the protocol specifies a simple, text-based format for embedding the function calling information of a generic client-to-server function within HTML content such that a user can initiate a call to the function while viewing an HTML document via the standard Web browser. Specialized functions (such as those listed above) can thereby be placed within standard Web documents, such as electronic catalog documents used by online merchants to sell products. For example, an online merchant can include within its Web catalog a button which allows a potential consumer to retrieve non-HTML product information on specific products, and to add the information to the client-side shopping basket. Because the protocol supports generic function calls, client-side and server-side functionality of the system can flexibly and efficiently be added and modified.

In operation of the preferred embodiment, client-to-server function call requests are passed over the Internet as HTTP POST messages from the Web browser to the Web server, and are forwarded to the commerce client using standard CGI (Common Gateway Interface) or ISAPI (Internet Server Application Program Interface) techniques. Responses to such client-to-server function calls (which may be in the form of server-to-client function calls) are returned to the Web browser as MIME (Multipurpose Internet Multimedia Extensions) messages. To route the response message to the commerce client (such as when the response message specifies a function call to be made by the commerce client), the response message is provided with a MIME type which corresponds to the commerce client.

In the context of online shopping, the present invention advantageously allows online merchants to take advantage of the widespread use by potential consumers of the World Wide Web, without being unduly restricted by the limited capabilities of existing World Wide Web protocols and components. In addition, the invention allows merchants and consumers to utilize existing Web components, and allows merchants to make use of existing HTML databases of catalog information.

BRIEF DESCRIPTION OF THE DRAWINGS

These and other features and advantages of the invention will now be described with reference to the drawings of certain preferred embodiments, which are intended to illustrate and not to limit the invention, and in which:

FIG. 4 is an HTML listing illustrating a preferred format for embedding function calling information within HTML documents.

FIG. 6 is an HTML listing illustrating a preferred format for embedding local function calls within HTML documents.

FIG. 8 shows a figure map consisting of FIGS. 8A, 8B, and 8C. Taken together, the three FIGS. 8A, 8B, and 8C, present a listing of an HTML file used as part of a user interface for the Shopper.

In the drawings, the first digit of each reference number indicates the Figure number in which the referenced item first appears. In addition, like reference numbers are used to designate like or functionally similar components.

DETAILED DESCRIPTION OF THE PREFERRED EMBODIMENTS

Figure 1:
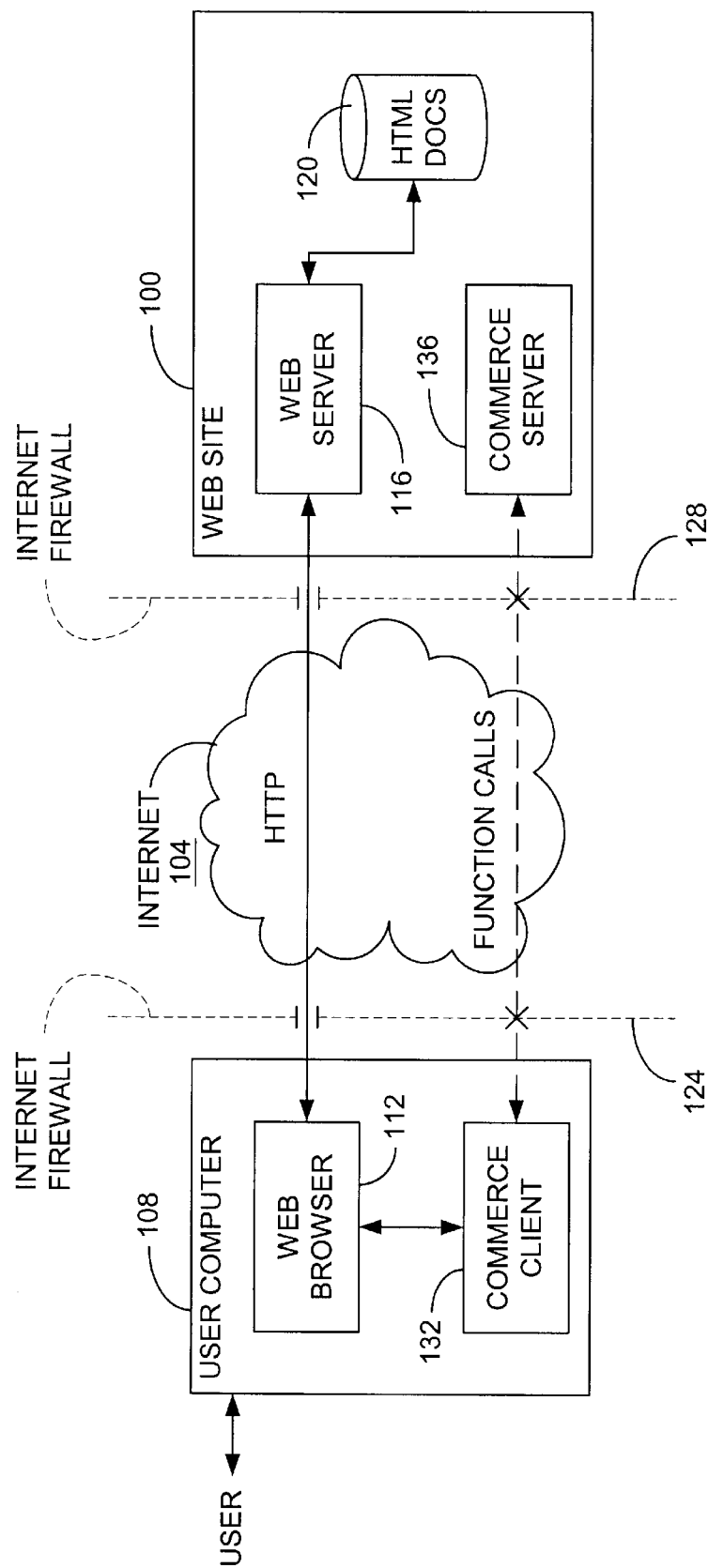
FIG. 1 is a high level architectural drawing illustrating some of the problems sought to be overcome by the present invention.

The present invention involves a system and method for making bi-directional function calls over the Internet between an application-specific client which runs in conjunction with a standard Web browser, and an application-specific server which runs in conjunction with a Web server. In accordance with the invention, the application-specific client and server communicate with one another using an extensible, bi-directional function-calling protocol (described in detail below) which "tunnels" function calling information through the HTTP message stream between the Web browser and Web Server. Because all function calls and function call responses are tunneled through HTTP, the application-specific client and server can communicate through Internet firewalls that permit the passage of HTTP messages.

In a preferred electronic shopping embodiment, the application-specific client (referred to herein as the "Shopper") includes functionality similar to that of a shopping cart, a wallet, and an address book, and the application-specific server includes functionality for providing a variety of commerce-related services (such as access/return product information, calculate tax, process order, etc.). As will be apparent, however, the system and method of making function calls can be used with other types of client-server applications.

To facilitate a complete understanding of the invention, the remainder of the detailed description is arranged within the following sections and subsections:

1. GLOSSARY OF TERMS AND ACRONYMS
2. OVERVIEW OF PROBLEMS SOUGHT TO BE OVERCOME (FIG. 1)
3. OVERVIEW OF PREFERRED ARCHITECTURE (FIG. 2)
4. ELECTRONIC SHOPPING IMPLEMENTATION (FIGS. 3–7)
   4A. FUNCTION CALLS (FIGS. 4 AND 5)
   4B. COMMUNICATIONS BETWEEN WEB BROWSER AND SHOPPER (FIGS. 6 AND 7)
5. EXAMPLE USER INTERFACE DOCUMENT (FIG. 8)
6. CONCLUSION

1. Glossary of Terms and Acronyms

The following terms and acronyms are used throughout the detailed description:

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as "Web documents" or "Web pages") that are accessible via the Internet, and (ii) the client and server software components which provide user access to such documents using standardized Internet protocols. Currently, the primary standard protocol for allowing applications to locate and acquire Web documents is HTTP (discussed below), and the Web pages are encoded using HTML (also discussed below). However, the terms "Web" and "World Wide Web" are intended to encompass future markup languages and transport protocols which may be used in place of (or in addition to) HTML and HTTP.

Client-Server. A model of interaction in a distributed system in which a program at one site sends a request to a program at another site and waits for a response. The requesting program is called the "client," and the program which responds to the request is called the "server." In the context of the World Wide Web, the client is a "Web browser" (or simply "browser") which runs on a computer of a user; the program which responds to browser requests by serving Web pages is commonly referred to as a "Web server."

TCP/IP (Transmission Control Protocol/Internet Protocol). A standard Internet protocol (or set of protocols) which specifies how two computers exchange data over the Internet. TCP/IP handles issues such as packetization, packet addressing, handshaking and error correction. For more information on TCP/IP, see Volumes I, II and III of Comer and Stevens, *Internetworking with TCP/IP*, Prentice Hall, Inc., ISBNs 0-13-468505-9(vol. I), 0-13-125527-4 (vol. II), and 0-13-474222-2(vol. III).

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or "HTML document") is subsequently transferred from a Web server to a browser, the codes are interpreted by the browser and used to parse and display the document. In addition to specifying how the Web browser is to display the document, HTML tags can be used to create links to other Web documents (commonly referred to as "hyperlinks"). For more information on HTML, see Ian S. Graham, *The HTML Source Book*, John Wiley and Sons, Inc., 1995 (ISBN 0471-11894-4).

Port or Port Number: (Also referred to as "socket number.") In the context of the Internet, a numerical identifier (normally provided in conjunction with an IP address) which is used by TCP/IP to direct incoming data to a particular application. Certain ports have been reserved by the Internet Assigned Number Authority (IANA) for certain applications. For example, port 80 is reserved for HTTP, and is used on Web sites to direct incoming traffic to a Web server. (See "URL" below.)

URL (Uniform Resource Locator). A unique address which fully specifies the location of a file or other resource on the Internet. The general format of a URL is protocol:// machine address:port/path/filename. The port specification is optional, and if none is entered by the user, the browser defaults to the standard port for whatever service is specified as the protocol. For example, if HTTP is specified as the protocol, the browser will use the HTTP default port of 80.

HTTP (Hypertext Transfer Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

HTTP POST. A type of HTTP message which is used to request that the Web server accept information from the Web client. This information may, for example, be in the form of a message to be posted to a newsgroup, or a database submission which is executed by a CGI script. (See "CGI" below.)

MIME (Multipurpose Internet Multimedia Extensions) Type. A file extension or attachment which specifies the type or format of the file (e.g., HTML, text, graphics, audio, etc.). MIME typing allows the Web browser to determine how to process a file that is received from a Web server. For example, a file of MIME type HTML (extension ".htm" or ".html") will be displayed by the browser, while a file of MIME type X-WAV (extension ".wav") will typically be passed to an audio player which can handle the Microsoft WAV format. Standard Web browsers come pre-configured to handle popular MIME types. In addition, standard Web browsers can easily be configured by the user to handle new MIME types; this typically involves specifying the file extension of each new MIME type, and specifying the path and filename of the application (referred to as a "MIME handler") to which files of such type should be passed.

Internet Firewall. A security system placed between the Internet and an organization's network (such as a LAN) to provide a barrier against security attacks. Internet firewalls typically operate by monitoring incoming and/or outgoing traffic to/from the organization's network, and by allowing only certain types of messages to pass. For example, a firewall may be configured to allow the passage of all TCP/IP traffic addressed to port 80, and to block all other traffic. For more information of Internet Firewalls, see Chapman and Zwicky, *Building Internet Firewalls*, O'Reilly publishing, 1995 (ISBN 1-56592-124-0).

CGI (Common Gateway Interface). A standard interface which specifies how a Web server (or possibly another information server) launches and interacts with external programs (such as a database search engine) in response to requests from clients. With CGI, the Web server can serve information which is stored in a format that is not readable by the client, and present such information in the form of a client-readable Web page. A CGI program (called a "CGI script") may be invoked, for example, when a Web user fills out an on-screen form which specifies a database query. One disadvantage of CGI is that it generally requires the launching of a separate process for each client request received. For more information on CGI, see Ian S. Graham, *The HTML Source Book*, John Wiley and Sons, Inc., 1995 (ISBN 0471-11894-4, pp. 231–278.

ISAPI (Internet Server Application Program Interface). Microsoft's interface for allowing a Web server (or other information server) to launch and interact with external programs in response to requests from clients. ISAPI programs are in the form of dynamic link libraries (DLLs) which run in the same process space as the Web server. Thus, ISAPI performs a similar function to that of CGI, but without requiring the launching of a separate process.

Documentation on ISAPI is available from Microsoft Corporation as part of the Microsoft Internet Information Server Software Development kit.

2. Overview of Problems Sought to be Overcome (FIG. 1)

FIG. 1 illustrates the general architecture of a system which operates generally in accordance with the objectives of present invention, and will be used to describe some of the problems sought to be overcome by the invention. With reference to FIG. 1, a user accesses a Web site 100 on the Internet 104 via a user computer 108. The user computer 108 includes a standard Web browser 112 which communicates with a Web server 116 using the HTTP protocol. The Web server 116 accesses a local store 120 of HTML documents (also commonly referred to "Web documents" or "Web pages") which can be requested, retrieved, and viewed by the user via the Web browser 112. These documents may, for example, include various information about an online merchant which operates the Web site, and information about the products sold by the merchant (such product specifications and graphic images of products).

As illustrated in FIG. 1, the user computer 108 may connect to the Internet via an Internet firewall 124. This will typically be the case, for example, if the user is accessing the Internet 104 via a private, company network. It is also possible (though less likely) that the Web site 100 will operate behind a respective Internet firewall 128. The Internet firewalls 124, 128 will normally be configured to permit the passage of TCP/IP messages addressed to port 80, and will thus permit the passage of HTTP traffic between the Web browser 112 and the Web server 116.

As described above, the existing World Wide Web architecture is not well suited for performing complex commerce-related client-server operations. One objective of the present invention, therefore, is to provide both a specialized electronic commerce client 132 ("commerce client") running on the user computer 108 in conjunction with the standard Web browser 112, and a specialized electronic commerce server 136 ("commerce server") running on the Web site 100, to handle a variety of specialized commerce-related functions. These specialized functions will depend upon the particular application for which the commerce client and server 132, 136 are being provided, such as electronic shopping, on-line banking, and investment tracking.

In the context of electronic shopping, these specialized functions may include various services for facilitating the analysis of merchant offerings and the placement of product orders. For example, the commerce client 132 may include functionality for (i) storing product information (including information contained within HTML documents viewed via the browser 112) from multiple merchants for subsequent recall and use, (ii) providing a mechanism to facilitate user comparison of information on like products from different merchants, (iii) storing, encrypting and forwarding to the merchants payment (e.g., credit card) information, (iv) storing and providing to merchants address information for the shipping of goods, and (v) passing receipts for online purchases to an online banking application such as Microsoft Money™ or Quicken®. Similarly, the commerce server 136 may include functionality for (i) retrieving product information (such as price and inventory) not contained within the merchant's HTML documents, (ii) capturing and processing orders from users, and (iii) calculating sales taxes and shipping and handling costs. The addition of such functionality (particularly on the client side) would provide considerable benefits over existing commerce systems.

Another objective of the invention is to provide an extensible, bi-directional function calling protocol for communications over the Internet between the commerce client and server 132, 136. As is well known in the art, the ability to communicate via function calls (as opposed to a hard-coded message format) provides for a high degree of flexibility and programming efficiency. With respect to protocol extensibility, it is difficult to predict the commerce-related services that may be desired in the future; thus, it is highly desirable to have an extensibility mechanism which allows arbitrary function calls to be added on the client and server sides, and which allows updated versions of the commerce client and server 132, 136 to take advantage of these new function calls while being able to interoperate with older versions of the commerce client and server.

With further reference to FIG. 1, one possible approach to achieving the foregoing objectives would be to design the commerce client and server 132, 136 to communicate "directly" (as illustrated by the dashed horizontal line) using a dedicated TCP/IP port (such as a port in the unreserved area, or a port which may be reserved with the IANA). However, as described above, any Internet firewalls 124, 128 between the user computer 108 and the Web site 100 will likely block TCP/IP traffic on such a port. Thus, the use of a dedicated port, at least at present time, would not be conducive to providing broad client access to Web sites of the system. Another objective of the invention, therefore, is to provide a client-server communications mechanism which allows users and merchants to engage in commerce through Internet firewalls.

As will be apparent to those skilled in the art, the above objectives are not unique to the field of electronic commerce, but apply more generally to (i) applications in which it is desirable to communicate, via a function-calling protocol, through firewalls, and (ii) applications in which it is desirable to provide a specialized client and server which communicate over the Internet in association with a Web browser and/or Web server. Accordingly, the commerce client and server 132, 136 may, in other embodiments of the invention, be other types of application-specific programs such as programs for performing electronic banking and/or tracking investments.

3. Overview of Preferred Architecture (FIG. 2)

Figure 2:
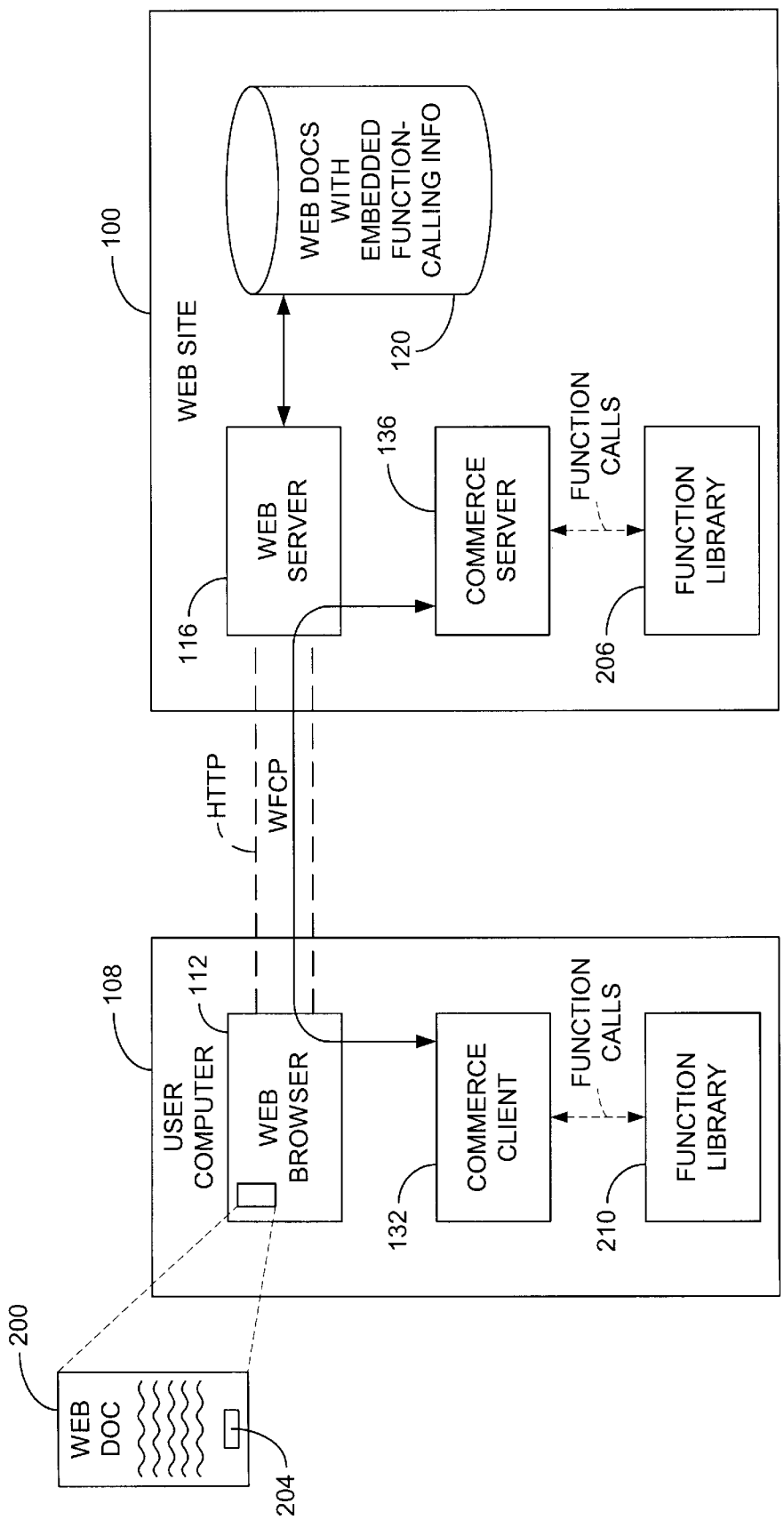
FIG. 2 is a high level drawing illustrating a preferred architecture and method for making function calls in accordance with the present invention.

The general architecture of a preferred electronic commerce system which operates in accordance with the above objectives is illustrated in FIG. 2. (In FIG. 2 and throughout the drawings, components which correspond to components shown in previous Figures are identified using the same reference numbers.) In accordance with the invention, the commerce client 132 and the commerce server 136 communicate with one another over the Internet (not shown) using an extensible, bi-directional function-calling protocol. As illustrated in FIG. 2, this bi-directional web function-calling protocol (abbreviated as "WFCP" in FIG. 2) effectively "tunnels" information through the HTTP message stream (shown in dashed lines) between the standard Web browser 112 and the Web server 116. Because all information is passed via HTTP, the commerce client and server 132, 136 can advantageously communicate through Internet firewalls (not shown in FIG. 2).

In accordance with the invention, the Web server 116 serves HTML documents which include embedded function calling information. This function calling information is embedded in a hidden form using standard HTML tags, and is provided in a predefined format (specified as part of the bi-directional function calling protocol) that is recognized by both the commerce client 132 and the commerce server 136. The embedded function calling information is tied to user-selectable informational content (e.g., hyperlinks or buttons) within the documents to allow users to initiate client-to-server function calls across the Internet by selecting (e.g., clicking on associated content items).

With reference to FIG. 2, for example, which pictorially illustrates an HTML document 200 being displayed by the Web browser 112, the document may include a user-selectable button 204 which includes a textual description (such as "buy," "update shopping basket," "retrieve price information," or "retrieve account information") of a corresponding action to be performed. In accordance with the invention, when the user clicks on this button, the corresponding function calling information is passed across the Internet as a standard HTTP POST message from the user computer 108 to the Web site 100. (As described below, this function calling information includes an identifier of the function to be called, and a variable-length set of arguments to be passed to the function.)

Upon receipt of the HTTP POST message, the Web server 116 parses the message and passes the function calling information to the commerce server 136. The commerce server in-turn makes the function call (on behalf of the commerce client 132) to the specified function within its function library 206. This function call will typically produce a response which needs to be returned to the user computer 108. (In the context of electronic shopping, the response message may include, for example, price or inventory information for a particular product, or the result of a tax calculation requested by the user.) This is accomplished by packaging the message as a MIME message, and sending the MIME message across the Internet from the Web server 116 to the Web browser 112. If the response message is in the form of an HTML response to be displayed by the browser 112, the MIME type of the message will be HTML. If on the other hand, the response message is in a form which requires interpretation by the commerce client 132 (such as when the response includes non-HTML product information), the response message will be tagged with a MIME type which corresponds to the commerce client 132, so that the browser 112 will automatically forward the message to the commerce client 132.

In the preferred embodiment, the response message generated on the server side may be in the form of a corresponding function call to be placed on the user computer 108, in which case the MIME message will include the necessary function calling information to allow the commerce client 132 to make the function call to its function library 210. Thus, function calls can be placed in both directions (client-to-server and server-to-client).

As will be appreciated by those skilled in the art, the provision of specialized client and server components which run in conjunction with existing, standard Web components provides significant benefits, particularly in the context of electronic commerce. In the context of merchant services applications, for example, a merchant can conveniently store relatively static catalog information as HTML documents, while storing relatively dynamic product information (such as price and inventory) in a separate database (not shown) which is accessed by the commerce server 136. This product information may advantageously be stored and served in a format which is recognized only by the specialized commerce client 132 (as opposed to the standard Web browser 112). Because the commerce client 132 runs in conjunction with the browser 112, the commerce client 132 can readily store both user-selected HTML (catalog) data from Web pages of merchants, and the associated non-HTML product information retrieved via client-to-server function calls.

Although FIG. 2 depicts a single Web server 116 interacting with a single commerce server 136, it will be recognized that other system configurations are possible. For example, multiple Web servers 116 could be provided (running on the same machine or on different machines) which interact with a single, shared commerce server 136; or, multiple commerce servers 136 could be provided which interact with a single Web server 116.

4. Electronic Shopping Implementation (FIGS. 3–7)

Figure 3:
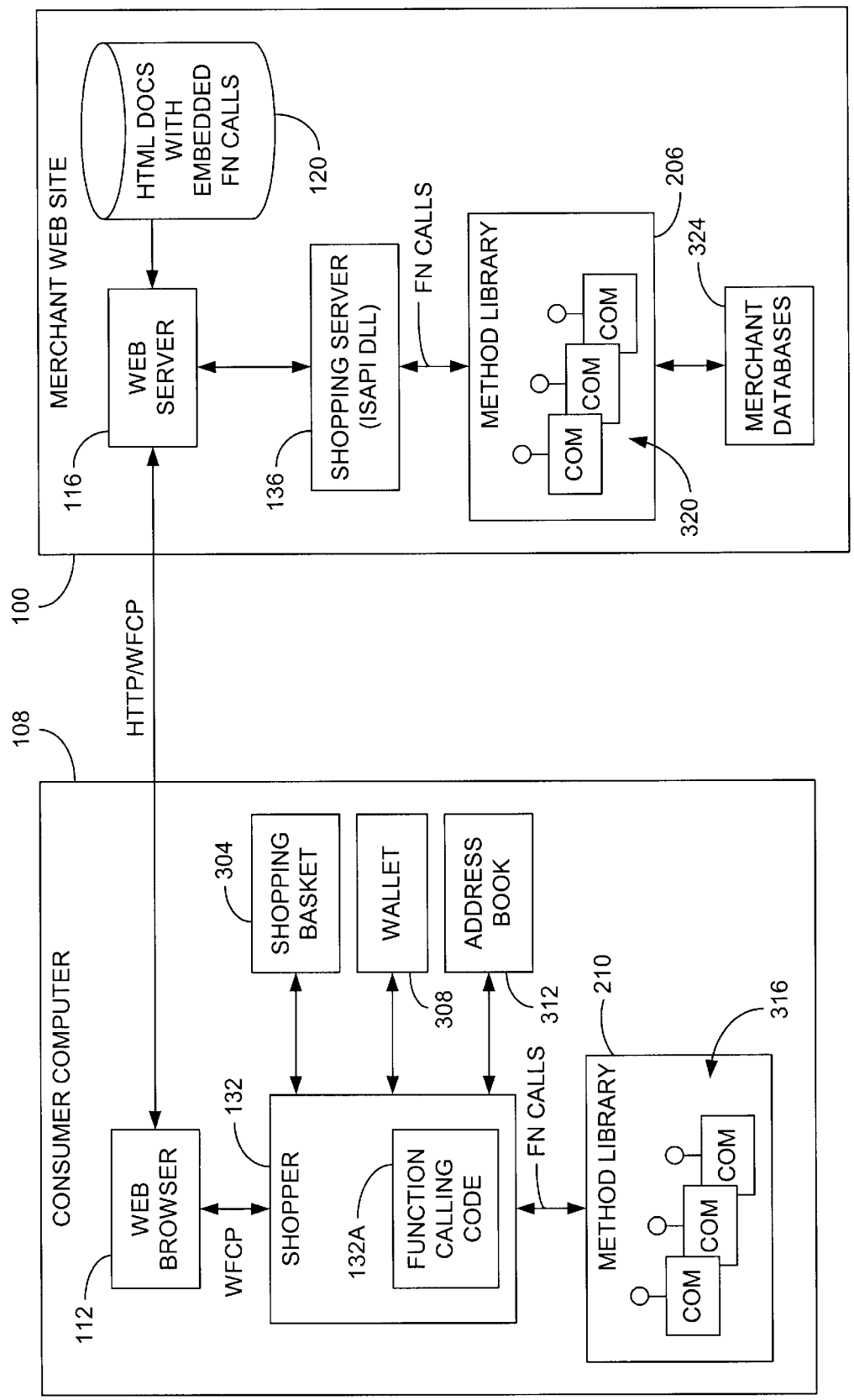
FIG. 3 is an architectural drawing illustrating the client and server components of an electronic shopping implementation of the system of FIG. 2.

FIG. 3 illustrates a preferred electronic shopping implementation of the system of FIG. 2. In this implementation, bi-directional function calls are made the Internet using a protocol referred to herein as the Web Function-Calling Protocol, or "WFCP." In addition, function calls are made locally on the user computer 108 (from the Web browser 112 to a separate process) using an extension of WFCP, referred to herein as Local WFCP (described below with reference to FIG. 6 and 7).

Referring to FIG. 3, a consumer computer 108 includes a conventional Web browser 112 (such as Microsoft's Internet Explorer 2.0, or Netscape Navigator 2.0), a Shopper process ("Shopper") 132, and a method library 210. The Web browser 112 is configured to pass MIME messages of type "x-ishopper" to the Shopper 132, which acts as a MIME handler for the browser. The Shopper 132 preferably runs as a separate process from the Web browser 112.

The Shopper 132 includes code for accessing and displaying data stored by three primary objects: a shopping basket object 304, a wallet object 308, and an address book object 312. (The data stored by these objects resides within corresponding files stored on the consumer's hard drive.) The shopping basket object 304 stores, under the control of the consumer, information on merchants and products that are of interest to the consumer. The wallet object 308 stores and provides secure access to payment source data, such as credit card numbers and checking account numbers, used for making online purchases. The address book object 312 stores and provides access to address information for shipping purposes.

The method library 210 includes COM (Component Object Model) methods for performing various operations with respect to the shopping basket, wallet and address book objects 304, 308 and 312. (In COM terminology, functions are referred to as "methods.") For example, the Shopper 132 recognizes an AddLineItem method for adding user-selected product information to the shopping basket 304. These methods are in the form of COM objects 316 stored on the consumer computer 108, and are called by function calling code 132 A of the Shopper 132.

The Shopper 132 and its related objects 304, 308, 312 and methods are described herein for the purpose of illustrating a preferred implementation and application of the function calling mechanism of the present invention. Other features and aspects of the Shopper 132 (which are not relevant to the function-calling features of the present invention) are described in detail in U.S. patent application Ser. No. 08/748,688, SYSTEM AND METHOD FOR CONDUCTING TRANSACTIONAL COMMERCE OVER A DISTRIBUTED NETWORK, which is incorporated herein by reference, and still pending.

With further reference to FIG. 3, a merchant Web site 100 includes a Web server 116, a storage device 120 which stores HTML documents (with embedded function calling information), a Shopping server 136, a method library 206, and one or more databases 324 which store product and other information of the merchant. The merchant Web site 100 may for example, be a stand-alone site which independently serves information with respect to a single merchant, or may be in the form of (or a part of) a centralized or distributed electronic mall system which serves the information of many different merchants. The Web server 116 is preferably the Microsoft Internet Information Server version 1.0, although other conventional Web servers can be used. The Shopping server 136 is preferably in the form of an ISAPI (Internet Server Application Program Interface) DLL (dynamic link library) which runs within the same process space as the Web server 116. A CGI script, or a DLL which uses another server extension API (such as NSAPI from Netscape), could alternatively be used.

The method library 206 includes a collection of COM objects 320 for performing a variety of database-query and computation-related services (described below). These methods provide access to merchant and product information stored within one or more merchant databases 324. For convenience, the Web server 116, Shopping server 136, and method library 206 are collectively referred to herein as the "Merchant Server."

The method library 206 on the server side includes methods for performing client services such as retrieval of product information, calculation of sales taxes, and capture of orders. Examples of these methods are listed and described in Table 1.

TABLE 1

| Method | Description |
| --- | --- |
| GetLineItem | Retrieves product information given SKU (stock keeping unit) number or other product identifier. |
| GetPrice | Retrieves price information given SKU number or other product identifier. |
| CalculateSH | Calculates shipping and handling costs given product/s and shipping logistics (e.g., shipping address and method). |
| CalculateTaxDue | Calculates shipping and handling costs given product/s and shipping logistics |
| ProcessOrder | Captures order submitted by consumer, and processes in a manner specified by merchant. |

The method library 206 on the client side includes two types of methods: (i) methods which can be invoked by the Merchant Server (such as the UpdateOrderInfo method) in response to execution of server-side function calls, and (ii) locally-invoked methods which do not involve any transfer of information over the Internet (such as a ShowWallet method, which shows the consumer the contents of the Wallet object 308). Examples of these client-side methods are listed and described in Table 2.

TABLE 2

| Method | Description |
| --- | --- |
| AddLineItem | Adds line item (stock keeping unit number, description, image, etc.) to shopping basket. Can be invoked by the user while viewing an HTML catalog page. |
| SubmitOrder | Takes all items saved in the shopping basket, requests payment information, encrypts the payment and shopping basket information, and then sends the encrypted information to the Merchant Server. Can be invoked by the user while viewing the contents of the shopping basket. |
| ShowWallet | Displays to the user the contents of the Wallet. |
| ShowAddressBook | Displays to the user the contents of the Address Book. |
| ModifyWallet | Pops up a dialogue that allows the user to add/delete/modify credit card and other payment information. |
| ModifyAddressBook | Pops up a dialogue that allows the user to add/delete/modify addresses stored within the address book. |
| ViewBasket | Builds an HTML file from the items currently stored within the shopping basket, and then passes the HTML file to the browser for display. |
| ViewHistory | Builds an HTML file from the items currently stored within a history file, and then passes the HTML file to the browser for display. Allows merchants to add a button that lets the consumer jump from a catalog page to a list of the items that have been purchased from the merchant. |
| DeleteItem | Removes a user-selected item from the shopping basket while the user is viewing the contents of the basket. |
| UpdateOrderInfo | Saves into the basket information that is common to a set of line items from the same merchant (e.g., tax and S/H charges). Invoked, for example, when the user selects an "UPDATE" button to obtain detailed pricing information on the entire shopping basket. |

Tables 1 and 2 are included herein to illustrate specific examples of the types of functions which can be provided on the client and server sides in accordance with the present invention. While these functions relate to electronic shopping, the function calling methodology of the present invention is not limited to electronic shopping systems, or to any other specific type of client-server application. In addition, Tables 1 and 2 are not intended to be a comprehensive list of the methods which may be provided on the client and server sides in the system of FIG. 3.

Standard communications components (such as TCP/IP stacks) which reside on the merchant Web site 100 and the consumer computer 108 are omitted from FIG. 3 to simplify the drawing.

Figure 5:
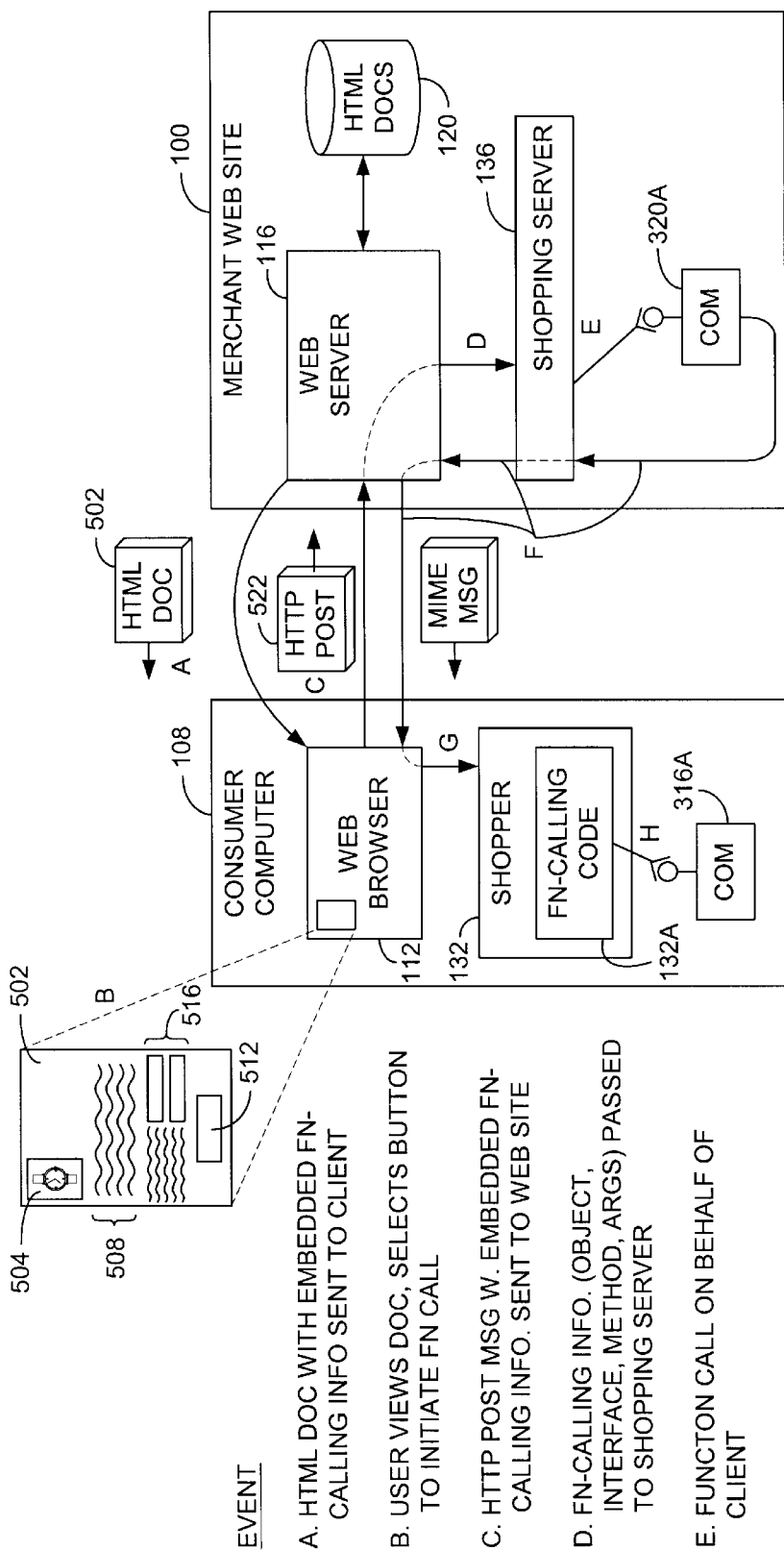
FIG. 5 is a flow diagram illustrating an example bi-directional function-calling sequence for the system of FIG. 3.

4A. Function Calls (FIGS. 4 and 5)

Function calls are made over the Internet in accordance with WFCP (the Web Function Calling Protocol), which makes use of the standard HTTP POST messages and MIME messages to pass function calling information and function call responses between the consumer computer 108 and the merchant Web site 100. Whenever a function call is made using this protocol, the following information is passed (via HTTP POST or MIME message) over the Internet as a sequence of type-value pairs:

Object. The PROG ID of the COM object to be called at the receiving side. The object may, for example, be a Tax Service Provider object which performs a variety of tax operations on the server side.

Interface. The name of a COM interface of the specified COM object. (In one implementation of WFCP, the interface name is omitted, and all calls are assumed to be to the same interface.)

Method. The name of the function to be called, such as CalculateTax. (Note: in COM terminology, a "method" is generally synonymous with a function.)

Arguments. The data set with which the operation is to be performed. The protocol advantageously allows different functions to have different numbers of arguments. In an existing implementation, the argument list is passed as a list of name-value pairs (separated by commas), and the protocol requires all arguments to be present and in order.

For example, a function call from the Web browser 112 to the merchant site 100 to request product information on a particular product (identified by its stock keeping unit or "SKU" number) may include the following information (shown in pseudo-code form):

OBJECT=Product_Information
INTERFACE=IProductInformation
METHOD=GetLineItem
SKU=123456

In accordance with the invention, this function calling information is embedded within an HTML document such that a specific action by the user (such as clicking on a "retrieve additional information" button) causes the function calling information to be transmitted to the Web server 116 within an HTTP POST message.

Upon receipt of the HTTP POST message, the Web server 116 passes the function calling information to the Shopping server 136, which in-turn makes the specified function call on behalf of the Shopper 132. (An example function calling sequence is described in detail below.) In the above example, the response message generated by the function call may include the following information:

OBJECT=x-ishopper
INTERFACE=ishopper
METHOD=AddLineItem
NAME=Socks
PRODUCTID=SK444
PRICE=7.99
QUANTITY=1
SIZE=Small
IMAGE=http://www.shopmart.com/store/clothing/socks/sk444.gif
REFERENCE_URL=http://www.shopmart.com/store/clothing/socks This information would be passed by the Web browser 112 to the Shopper 132, which would in-turn make the identified function call (to the AddLineItem method) to add the information to the Shopping Basket 304. (In this example, the NAME, PRODUCTID, PRICE, QUANTITY, SIZE, IMAGE, and REFERENCE_URL are arguments of the function call).

FIG. 4 is an example HTML sequence which illustrates a preferred format (referred to herein as the "WFCP format") for embedding a function call within an HTML document. In this example, a single function call (to method CalculateTaxDue) is linked to the button "Calculate Sales Tax" such that the function calling information (OBJECT, INTERFACE, METHOD and ARGS) will be sent to URL "http://www.merchant.com/mig.dll" when the user selects the button. (In this example, "mig.dll" is the file name of the Shopping server 136.) Because the function calling information is embedded using an input type of "hidden," the information will not be seen by consumers during normal viewing of the document.

As illustrated by FIG. 4, the present invention provides a simple, text-based format for embedding function calling information within HTML documents, allowing authors of HTML documents to embed friction calls without having to learn a complex friction calling language.

FIG. 5 is a flow diagram illustrating an example sequence of events for the system of FIG. 3, with the labels A–H indicating the order in which such events occur. Referring to event A, an HTML document 502 is initially passed across the Internet from the Web server 116 to the Web browser 112 in response to a request from a consumer. This HTML document 502 includes embedded friction calling information (normally placed within the document during the authoring stage) which is linked to textual and/or graphical content of the document. As noted above, this function calling information includes identifiers of the object, interface, and method of each embedded function call, plus the associated function-call arguments. The HTML document 502 may, for example, be stored on a storage device 120 of the merchant Web site, or may be generated "on-the-fly" using known techniques. Although the FIG. 5 example illustrates a sequence in which the HTML document is downloaded from a Web site, it should be understood that HTML documents with embedded function calls can also be stored locally on the consumer's computer 108 (e.g., as components of the Shopper 132).

Referring to event B in FIG. 5, the HTML document 502 is displayed to the consumer by the Web browser 112. In this example, the HTML document 502 includes a graphic 504 of a product, and textual description 508 of the product, and a button 512 (such as a "BUY" or "GET PRODUCT INFORMATION" button) which allows the consumer to initiate some action with respect to the displayed product. The HTML document may also include a series of fields 516 for allowing the consumer to specify information relevant to the action being requested. For example, fields may be provided to allow the consumer to specify the quantity and color of a product to be purchased. Other buttons (not shown) may additionally or alternatively be provided within the document 502 for allowing the user to initiate actions such as calculate sales tax, place information in shopping basket 304, or show contents of wallet 308.

Associated with the button 512 is the function calling information for making a corresponding function call (or sequence of function calls). This information may, for example, be OBJECT=offer_capture
INTERFACE=IOrderCapture
METHOD=ProcessOrder
ARGS=arglist where the argument list includes the SKU number of the product along with information entered by the consumer in the fields 516. As illustrated by FIG. 4, this function-calling information is provided in the document along with a target URL (of the merchant Web site 100) such that an HTTP POST message containing the information will be sent to the URL if the consumer clicks on the button 512. In this example, the URL would include a definition of the Shopping server 136 to which the function-calling information is directed. Although the target URL in this example corresponds to the Web site 100 that is the source of the HTML document, the target URL could be that of a different Web site.

With reference to event C in FIG. 5, when the consumer clicks on the button 512, the browser 112 generates an HTTP POST message 522 and sends the POST message to the URL of the merchant Web site 100. This message 522 includes the function calling information (object, interface, method and arguments) of the function call. If multiple function calls were linked to the button 512, the POST message would include the function calling information for each such function call.

With reference to event D, upon receiving the POST message the Web server 116 loads the Shopping server 136 (if not already loaded), and passes the WFCP-formatted function calling information to the Shopping server 136. With reference to event E, the Shopping server 136 then invokes the specified COM object 320A, and passes the arguments to the specified method using the specified interface; the Shopping server 136 thereby makes the function call on behalf of the Shopper 132. Depending upon the method called, the function call may, for example, involve a query of and/or an update to the merchant databases 324 (FIG. 3). For example, if an order capture method is called, the function call may update the merchant databases 324 to, for example, reflect the number of items being purchased by the consumer.

With reference to event F, the function call normally produces a response message which needs to be passed across the Internet to the consumer computer 108. This response message is in the form of a MIME message having a MIME type which corresponds to the intended recipient. For example, the response message may be an HTML message (MIME type "html") to be displayed by the Web browser 112. In this example, the response message has a MIME type of "x-ishopper" (corresponding to the Shopper 132), and specifies a function call (object, method, interface and arguments) to be executed by the Shopper. This server-to-client function call is specified within the MIME message using the same format as used for client-to-server function calls. As illustrated in FIG. 5, the function call response message is returned to the Web browser 112 via code of the Shopping server 136 and the Web server 116.

With reference to event G, upon receiving the response message the Web browser 112 strips off the MIME headers and passes the message to the Shopper 132. (As indicated above, the Shopper 132 acts as a MIME handler for messages of type x-ishopper.) With reference to event H, the function calling code 132 A of the Shopper 132 then makes the function call on the consumer computer 108 in the same manner performed by the Shopping server 136 on the merchant Web site 100. (The function calling code 132A of the Shopper 132 is essentially a replica of the function calling code of the Shopping server.) This function call may, for example, be an AddLineItem method which adds product information (passed as function call arguments) to the shopping basket 304 (FIG. 3).

Advantageously, WFCP is not tied to any specific function or set of functions. Thus, new client-side and server-side functions can be added (and embedded within HTML documents) without modification to the existing function-calling components 132A, 136.

4B. Communications Between Web Browser and Shopper

In the FIG. 5 example, the WFCP-formatted function calling information embedded within the HTML document causes a function call to be made on the merchant Web site 100, which in-turn causes a function call to be made by the Shopper 132. In the preferred embodiment, HTML-embedded function calls can also be made "locally" (i.e., directly from the Web browser 112 to the Shopper 132) on the consumer's computer 108. This is accomplished in-part by making use of a Local Host service of existing TCP/IP stacks, as described below. This ability to make local function calls from HTML, combined with appropriate client-side functions, provides an efficient mechanism for allowing the consumer to perform actions with respect to the shopping basket 304, the wallet 308 and the address book 312 while viewing HTML documents via the browser.

By way of background, Local Host is a TCP/IP loop-back facility which allows a user to verify that a TCP/IP stack has been set up properly on a computer. This facility is invoked whenever a message is sent to an IP address of 127.0.0.1, which TCP/IP interprets as being the local machine. If, for example, a program sends a message to the address 127.0.0.1, the local TCP/IP stack will return the message (to the same program or to a program listening on a designated port), without sending the message over the network. As described below, the system of the preferred embodiment uses this facility to send HTTP POST messages (containing WFCP-formatted function calling information) from the browser 112 to the Shopper 132. This unique application of the Local Host facility is described in detail in U.S. patent application Ser. No. 08/748,688, entitled SYSTEM AND METHOD FOR MAKING FUNCTION CALLS FROM A STANDARD WEB BROWSER TO A LOCAL APPLICATION which is incorporated herein by reference in its entirety, and is also summarized herein and it is now U.S. Pat. No. 5,956,483.

FIG. 6 is an HTML sequence which illustrates how a local function call is embedded within an HTML document in accordance with this feature of the system. This general format is referred to herein as the Local WFCP or "L-WFCP" format. In this example, the parameters of the function call are OBJECT=WalletOCX. 1, INTERFACE=IWallet, METHOD=ShowWallet, and ARGS=arglist, and the function call is linked to a user-selectable button with the label "Show Wallet." When the user clicks on this button, an HTTP POST message is sent from the browser 112 to the Shopper 132, which in-turn makes the function call to cause the wallet 308 (FIG. 3) to be displayed.

As can be seen by comparing FIG. 6 to FIG. 4, the Local WFCP format is identical to the format for other WFCP function calls, with the exception that the destination address is 127.0.0.1:100 (rather than the URL of a target Web site). The number "100" which follows the colon in this address specifies an arbitrarily-selected unreserved port that the Shopper 132 continuously listens to (as described below), and is used by the TCP/IP stack to locally route the HTTP POST message.

Figure 7:
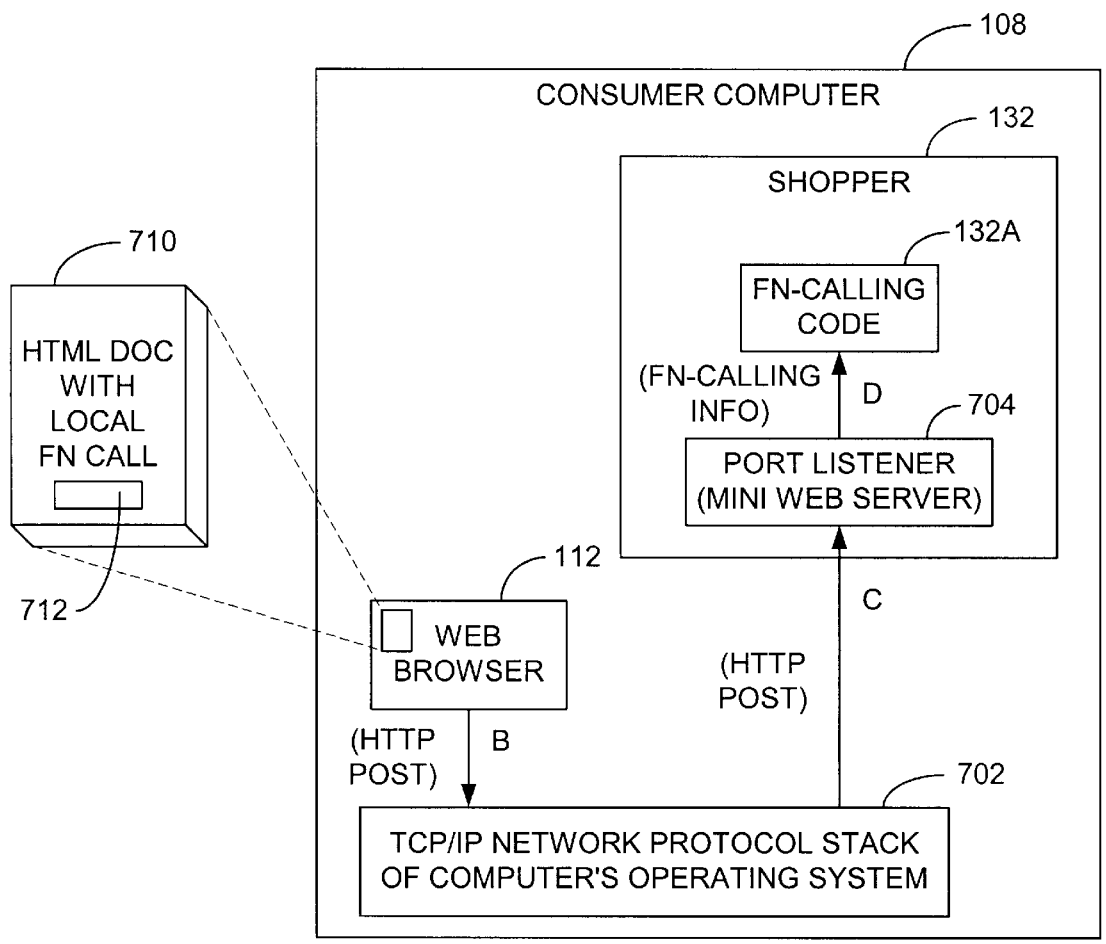
FIG. 7 is an architectural drawing and flow diagram illustrating how local function calls are made from the Web browser to the Shopper application of FIG. 3.

FIG. 7 illustrates the software components involved, and the flow of information between these components, whenever a Local WFCP function call is made. The operating system of the consumer computer 108 includes a TCP/IP stack 702 that has a Local Host facility. The operating system may, for example, be Microsoft Windows 95 or Microsoft Windows NT. The Shopper 132 includes a port listener 704 (or "mini Web server") which continuously listens to traffic on TCP/IP port 100. Unused ports other than port 100 can additionally or alternatively be used, provided that there is a correspondence between the ports listened to by the Shopper 132 and the port numbers specified within the HTML documents of the system.

The data flow sequence illustrated in FIG. 7 will now be described. With reference to events A and B, the consumer views an HTML document 710 which includes embedded L-WFCP function calling information (formatted as in FIG. 6) that is linked to a user-selectable button 712. This HTML document 710 may, for example, be a locally-stored document which serves as part of Shopper's user interface, or may be part of a catalog downloaded from the merchant Web site 100. When the consumer selects the button 712, an HTTP POST message addressed to IP address 127.0.0.1, port 100 is sent from the Web browser 112 to the TCP/IP stack 702. (To ensure that the Web browser 112 does not pass the message to a firewall proxy which blocks port 100 traffic, the Web browser may initially be configured to not use the proxy for IP address 127.0.0.1.) This HTTP POST message contains the L-WFCP-formatted function calling information contained within the Web document 710.

With reference to events C and D, the address 127.0.0.1 invokes the Local Host facility of the TCP/IP stack 702, causing the HTTP POST message to be routed to the port listener 704 of the Shopper 132. Upon receiving the HTTP POST message, the port listener 704 launches the function-calling code 132A of the Shopper (if not already running), and passes the function calling information (object, interface, method and arguments) to the function-calling code. The Shopper's function-calling code 132A then makes the specified function call (not shown in FIG. 7) as described above in the FIG. 5 example.

As will be apparent from the foregoing, it is important that the port listener 704 be running at the time the local WFCP function call is made. In one embodiment, this is accomplished by configuring the TCP/IP stack 702 to automatically launch the port listener 704 (if not already running) whenever a message addressed to port 100 is received. In another embodiment, a hidden tag is embedded within every HTML document that includes a Local WFCP function call, and a file association is specified (e.g., using the Microsoft Windows File Manager or Explorer) between this tag and the port listener 704 so that the port listener is automatically launched by the Web Browser when the tag is encountered.

5. Example User Interface Document (FIG. 8)

FIG. 8 (consisting of FIGS. 8A–C) is a listing of an example HTML document which is used in an existing implementation of the Shopper 132. This HTML document, which includes embedded WFCP and Local WFCP function calls, is stored on the consumer computer 108 (along with the referenced GIF files) as part of the Shopper's user interface. The function calls embedded within this document are formated in accordance with implementations of WFCP and Local WFCP in which the name of the interface is omitted.

6. Conclusion

While certain preferred embodiments of the invention have been described, these embodiments have been presented by way of example only, and are not intended to limit the scope of the present invention. For example, although the example function calls provided in this disclosure relate to electronic commerce applications, it will be recognized that the underlying function calling protocol and methodology can be used to make function calls in connection with other types of client-server applications. Additionally, although the disclosure has focussed on the use of HTML and HTTP to make function calls, it will be recognized that the principles of the invention extend to other markup languages and transport protocols. Accordingly, the breadth and scope of the present invention should be defined only in accordance with the following claims and their equivalents.

In the claims which follow, alphabetic characters used to designate claim steps are provided for convenience of description only, and are not intended to imply any particular order for performing the steps.

What is claimed is:

1. A method of making a function call over a distributed network, comprising:

(a) sending a hypertext document from a Web server to a Web browser over the distributed network, the hypertext document including embedded function calling information that is linked to a user-selectable portion of the hypertext document, the Web browser running on a computer of a user;

(b) displaying the hypertext document to a user via the Web browser;

(c) in response to selection of the user-selectable portion, sending a request message from the Web browser to the Web server, the request message containing the embedded function calling information;

(d) passing the function calling information from the Web server to an application-specific server associated with the function calling information, wherein the application-specific server supports multiple objects that are individually callable using function calls;

(e) placing a function call with the application-specific server and the function calling information, the function call producing a response message; and (f) sending the response message over the distributed network to the computer of the user.

2. A method according to claim 1, wherein step (c) comprises sending an HTTP POST message from the Web browser to the Web server.

3. A method according to claim 1, wherein the application-specific server provides consumer access to product information of at least one merchant, and wherein step (f) comprises sending product information over the distributed network to the user computer in response to the function call.

4. A method according to claim 3, wherein the hypertext document comprises a graphical image of a product available from a merchant.

5. A method according to claim 1, wherein step (a) comprises sending the hypertext document over the Internet.

6. A method according to claim 1, wherein step (f) comprises sending the response message from the Web server to the Web browser.

7. A method according to claim 6, further comprising passing at least a portion of the response message from the Web browser to an application-specific client running on the computer of the user.

8. A method according to claim 7, further comprising using the response message to place a function call on the computer of the user with the application-specific client.

9. A method according to claim 8, wherein the hypertext document, the function-call request message and the response message are passed over the distributed network using a standard hypertext transport protocol.

10. A method according to claim 9, wherein step (a) comprises passing the hypertext document through a network firewall which separates the Web Browser and the Web server, the network firewall configured to permit the passage of messages of the standard hypertext transport protocol.

11. A method according to claim 1, wherein the hypertext document is formed from coding of a standard hypertext markup language that does not support function calls.

12. A method according to claim 1, wherein step (f) comprises sending a MIME message from the Web site to the computer of the user.

13. A method according to claim 1, wherein the embedded function calling information specifies a function to be called and includes a variable-length set of arguments of the function, and wherein step (e) comprises passing the variable-length set of arguments to the function.

14. A method according to claim 13, wherein the function calling information comprises respective identifiers of at least an object and a method of the object.

15. A client-server type electronic commerce system, comprising:

a user computer and a Web site coupled via the Internet, the user computer running a Web browser which communicates with a Web server running on the Web site, the Web browser and Web server communicating by passing messages over the Internet according to a standard hypertext transport protocol; and an electronic commerce application program comprising a client-side commerce program running the user computer and a commerce server running on or in association with the Web site, the commerce server supporting a plurality of objects that are individually callable using function calls, each function call specifying a function to be called and a set of arguments to be passed to the function; and the client-side commerce program and the commerce server communicating via function calling protocol, the function calling protocol tunneling through the standard hypertext transport protocol by embedding the function calls in requests and responses within the standard hypertext transport protocol messages between the Web browser and the Web server.

16. An electronic commerce system according to claim 15, whereby the client-side commerce program and the commerce server can communicate through an Internet firewall which permits the passage of the standard hypertext transport protocol messages.

17. An electronic commerce system according to claim 15, wherein the function call requests are embedded within HTTP POST messages passed from the Web browser to the Web server, and wherein the function call responses are embedded within MIME messages passed from the Web server to the Web browser.

18. An electronic commerce system according to claim 15, wherein function calling protocol specifies a format for embedding function calling information within Web documents using a standard markup language which does not support function calls.

19. An electronic commerce system according to claim 15, wherein the Web browser is configured to use the client-side commerce program as a MIME handler.

20. An electronic commerce system according to claim 15, wherein the function calling protocol is a bi-directional function calling protocol which supports both (i) function calls from the user computer to the Web site, and (ii) function calls from the Web site to the user computer.

21. World Wide Web site, comprising:

a computer system coupled to the Internet, the computer system including a computer-readable storage medium which stores a plurality of Web documents;

a Web server running on the computer system, the Web server providing user access to the plurality of Web documents by transmitting the Web documents over the Internet to computers of users;

an application-specific server running on the computer system external to the Web server;

a plurality of objects on the computer system and dynamically callable via function calls passed in from the Web server to the application-specific server without the Web server being required to interpret the function calls, each function call specifying an object to be called, a method supported by the object, and a set of arguments to be passed to the method; and wherein at least one Web document of the plurality includes a function call embedded therein with tags of a standard markup language which does not support function calls, the function call being linked to informational content of the Web document such that user selection of the informational content causes a function call request message to be transmitted over the Internet to the Web server, which then passes the function call to the application-specific server to dynamically call a corresponding object.

22. A World Wide Web site according to claim 21, wherein the standard markup language is HTML.

23. A World Wide Web site according to claim 21, wherein the function call request message is an HTTP POST message which contains at least a portion of the embedded function calling information.

24. A World Wide Web document stored on a computer readable medium, comprising:

user-viewable informational content;

a plurality of tags of a standard markup language which does not support function calls, the tags provided in association with the informational content, wherein the tags are interpreted by a Web server; and function calling information linked to a user-selectable portion of the informational content with the tags of the standard markup language, the function calling information embedded within the document such that user selection of the user-selectable portion via a Web browser program running on a user computer causes a function call request message to be transmitted over a computer network from the user computer to the Web server, the function call request message specifying a function supported by an object running external to the Web server and a set of arguments to be passed from the Web server to the function, and wherein multiple functions are supported by multiple objects running external to the Web server.

25. A World Wide Web document according to claim 24, wherein the standard markup language is HTML.

26. A World Wide Web document according to claim 24, wherein the function calling information is embedded within the document such that user selection of the user-selectable portion causes an HTTP POST message to be transmitted over the Internet from the user computer, the HTTP POST message containing at least a portion of the function calling information.

27. A World Wide Web document according to claim 24, wherein the function calling information comprises at least (i) a target URL, (ii) a variable-length set of function-call arguments, and (iii) an identifier of a function to be called with the function-call arguments by an entity identified by the URL.

28. A World Wide Web document according to claim 24, wherein the function calling information is embedded within the document in a hidden form.

29. A World Wide Web document according to claim 24, wherein the function calling information is linked to a user-selectable button of the document, the user-selectable button identifying an operation to be performed.

30. A Web commerce server comprising:

a server application program that receives a request message from a Web browser across the Internet using a standard hypertext transport protocol, the request message containing embedded function calling information that is linked to a user-selectable portion of a hypertext document, wherein the embedded function calling information specifies a function to be called; and an object library accessible to the server application program, wherein the object library contains a plurality of objects that are individually callable using function calls.

31. A Web commerce server as recited in claim 30, wherein the function call information is embedded within HTTP POST messages passed from the Web browser to the Web commerce server.

32. A Web commerce server as recited in claim 30, wherein the server application program receives a response from the function call.

33. A Web commerce server as recited in claim 32, wherein the response from the function call is communicated by the server application program to the Web browser across the Internet using a standard hypertext transport protocol.

* * * * *